United States Patent [19]

Thirouard et al.

[11] Patent Number: 4,562,350
[45] Date of Patent: Dec. 31, 1985

[54] OPTICAL DEVICE CONTAINING A SEMICONDUCTOR LASER

[75] Inventors: Michel Thirouard; Louis Arquié, both of Paris, France

[73] Assignee: Thomson-CSF, Paris, France

[21] Appl. No.: 488,810

[22] Filed: Apr. 26, 1983

[30] Foreign Application Priority Data

Apr. 29, 1982 [FR] France .................................. 82 07424

[51] Int. Cl.⁴ .................................................. H01J 5/02
[52] U.S. Cl. ........................................ 250/239; 357/19
[58] Field of Search ............... 362/259, 285, 287, 800; 250/552, 216, 239, 551; 313/498, 499, 511, 512; 357/17; 350/96.20

[56] References Cited

U.S. PATENT DOCUMENTS

| | | | |
|---|---|---|---|
| 4,168,883 | 9/1979 | MacLeod | 250/552 |
| 4,184,741 | 1/1980 | Hawk et al. | 350/96.20 |
| 4,186,996 | 2/1980 | Bowen et al. | 357/17 |
| 4,295,152 | 10/1981 | Khoe et al. | 357/17 |
| 4,386,362 | 5/1983 | Kessler et al. | 357/17 |
| 4,403,243 | 9/1983 | Hakamada | 350/96.20 |

*Primary Examiner*—David C. Nelms
*Attorney, Agent, or Firm*—Oblon, Fisher, Spivak, McClelland & Maier

[57] ABSTRACT

A method which makes it possible to produce an optical device containing a semiconductor laser emitting a beam of parallel light which is positionally located with respect to a mechanical axis. It consists in positioning the laser with respect to an objective along three mutually orthogonal directions, and thereafter in assembling this laser and objective by means of bonding.

6 Claims, 7 Drawing Figures

FIG.1

OPTICAL DEVICE CONTAINING A SEMICONDUCTOR LASER

BACKGROUND OF THE INVENTION

1. Field of the Invention

The present invention relates to a method of assembling an optical device containing a semiconductor laser.

In actual fact, the problem is that of producing a laser module emitting a beam of parallel light located with respect to a particular axis and in particular of associating a laser with an objective.

2. Discussion of the Background

It is known that the elements with which the laser and the objective are integral may be joined together by a variety of assembling means which may, for example, comprise screws.

In effect, the emitting side of the semiconductor laser may be positioned at the focus of an objective which, firstly, has an adequate numeric aperture and, secondly, an optical axis coincident with its mechanical axis.

SUMMARY OF THE INVENTION

To resolve this problem, the method of the invention consists in positioning the laser with respect to the objective along the different coordinate axes of an orthonormal trihedron comprising axes Ox, Oy and Oz which will be denoted in the following by the notation Oxyz, by performing the positioning in the plane xOy and then with respect to the axis Oz. The assembling of the elements with which the laser and the objective are integral is performed by bonding.

The invention has as its object a method of assembling an optical device emitting a beam of parallel light along a particular axis containing a semiconductor laser and a first objective having an optical axis coinciding with this particular axis, comprising:
- a first step of positioning the laser with respect to this first objective in a plane perpendicular to the optical axis of this first objective,
- a second step of positioning the laser with respect to this first objective along an axis having the same direction as the optical axis,
- a step of bonding the optical device comprising this laser and this first objective, this stage comprising a phase for introduction of the adhesive, and a phase taking place once the positioning of the laser with respect to this first objective has been completed.

The invention equally has as its object the optical device obtained by such a method, and the mounting or assembling bench for application of a method of this kind.

BRIEF DESCRIPTION OF THE DRAWINGS

A clearer understanding of the invention will be gained and other features will become apparent from the following description given with reference to the accompanying drawings, in which:

FIG. 1 illustrates the assembling method in accordance with the invention,

DESCRIPTION OF THE PREFERRED EMBODIMENT

Figure 2:
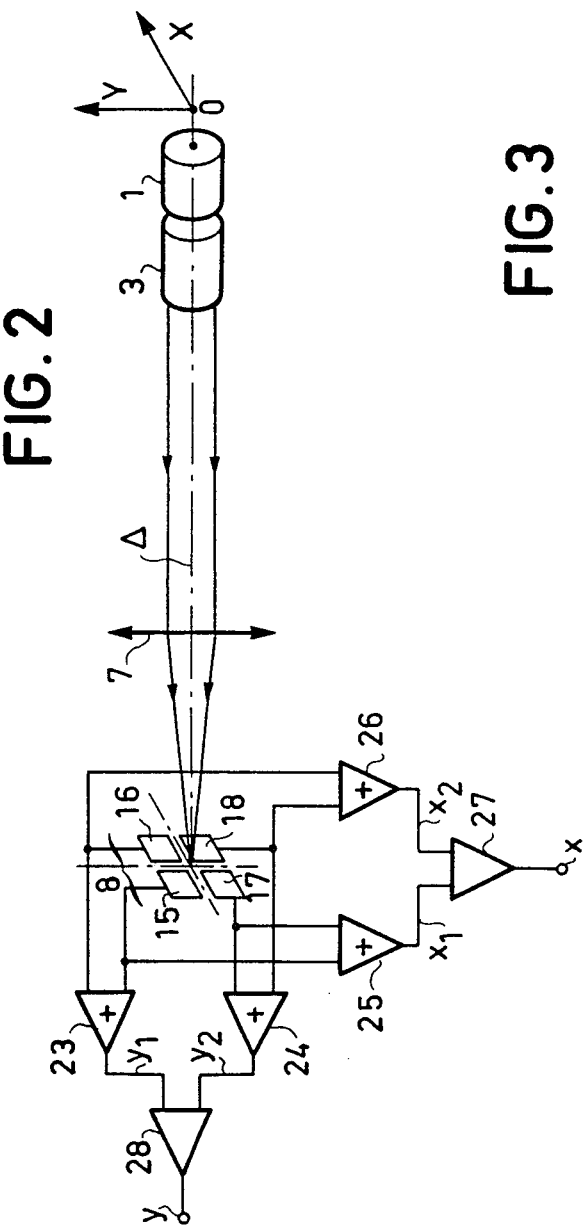
FIGS. 2, 3, 4, 5 and 6 illustrate different particular features of the assembling or mounting bench employing the method of the invention.

The method in question renders it possible to produce an optical device containing a semiconductor laser emitting a beam of parallel light, located with respect to a particular axis.

To this end, it is a question of positioning the emitting zone of a semiconductor laser at the focus of an objective which firstly has an adequate numeric aperture and secondly an optical axis coinciding with this particular axis. The mechanical axis of the element containing the objective should consequently coincide with the optical axis.

This positioning action having been performed, the laser and the objective should thereupon be assembled, and this is performed by bonding.

The positioning of the laser 1 with respect to the objective 3 is performed in several stages. These two elements are apparent from FIG. 1. The laser 1 is first positioned in the plane xOy of an rectangular trihedron Oxyz with respect to the objective 3. The laser 1 is then positioned along the axis Oz of the trihedron. These different positioning actions are performed by means of a micromanipulator 2 with which the laser 1 is integrally connected. The objective 3 is integral with a casing which is immobilised in an element 4 recessed in the form of a "V".

The laser 1 may thereupon be repositioned with respect to the objective 3 in the plane xOy. The laser 1 - objective 3 assembly is produced by bonding.

Figure 1:
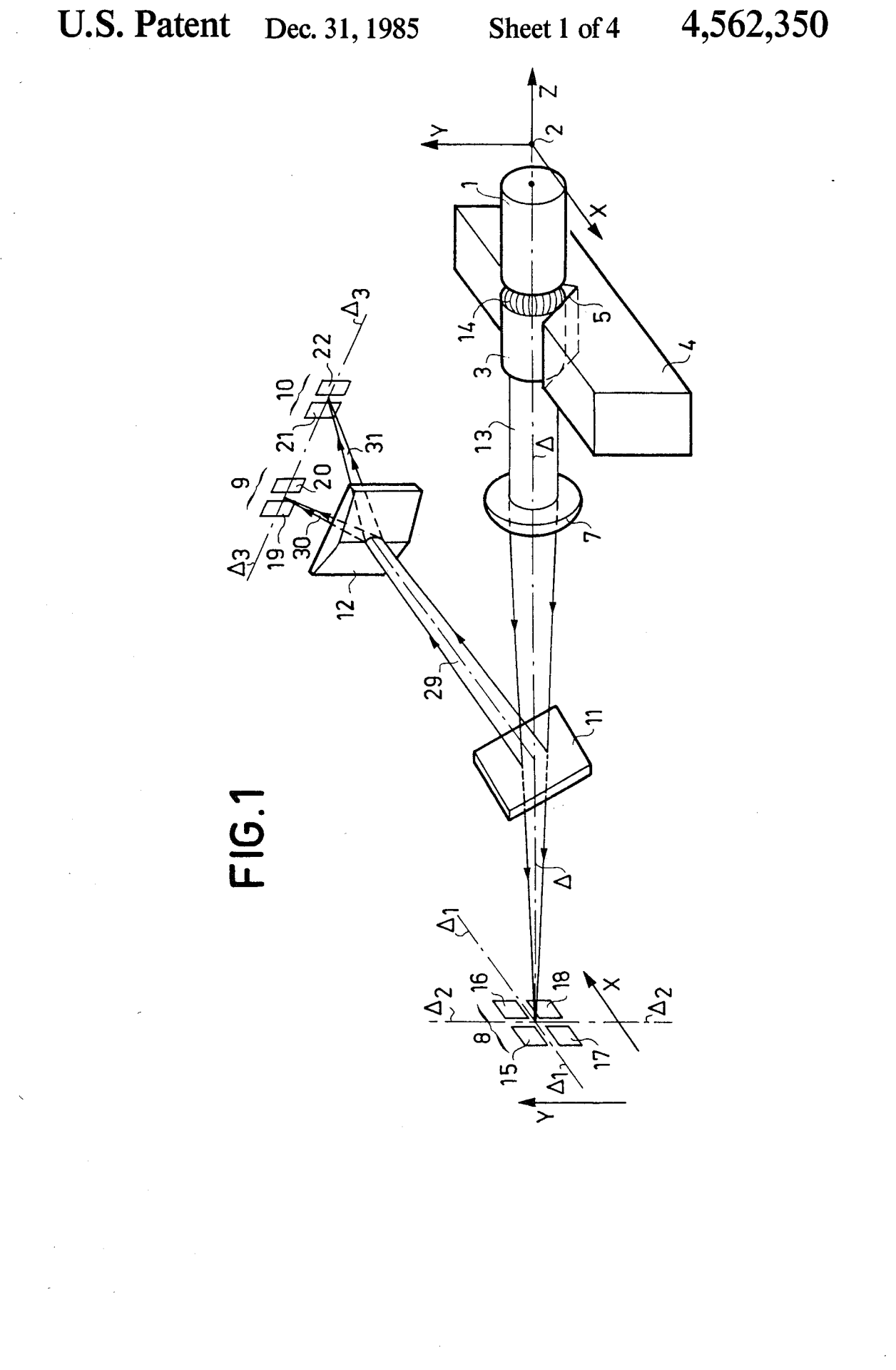

As illustrated in FIG. 1, the casing containing the laser 1 is integral with a micromanipulator 2 permitting adjustment in positioning in the three directions of the three axes of an rectangular trihedron Oxyz.

The objective 3, referred to as "first objective" is integral with a casing which is immobilised in a Vee (notch) 4 of which the crest 5 establishes the optical axis Δ of the assembling bench and of the future optical device.

A focussing objective 7 permits focussing of the beam 13 coming from the laser 1 after passing through the first objective 3, on the four-quardrant or sector photodiode 8 as well as on the two-quadrant or sector photodiodes 9 and 10 by means of the splitting member 11.

This splitting member 11 makes it possible to separate the functions: adjustment in the plane xOy and adjustment along the axes Oz, and thus to secure satisfactory dissociation between these two adjustments.

The biprism 12 permits splitting in two the light beam 29 reflected by the splitting member 11 and in the same way of illuminating the centre of the photodiodes 9 and 10 when the adjustment along the axis Oz is correct. All the aforesaid elements are supported on a stable and rigid beam.

The mounting bench of the optical device is organised in such a manner that the centre of the photodiode 8 lies on the optical axis Δ and that the position of the biprism with respect to the photodiodes 9 and 10 implies analogous illumination of their centres if the original light beam is parallel.

The photodiode 8 is a diode comprising four sectors or quadrants, which is situated in a plane at right angles to the optical axis Δ. It comprises four detectors delimited by two axes $\Delta_1$ and $\Delta_2$, of which the point of intersection lies on the optical axis Δ. These axes $\Delta_1$ and $\Delta_2$ are parallel to the axes Ox and Oy of the orthonormal trihedron Oxyz.

To perform the positional adjustment of the laser 1 with respect to the objective 3 in the plane xOy which is parallel to the plane formed by the two axes $\Delta_1$, $\Delta_2$, use is made of different circuits connected to the four photodetectors 15, 16, 17, 18 of the diode 8.

To perform the adjustment along the axis Oy, the photodetectors 15 and 16 are connected to the two inputs of an adder 23. The photodetectors 17 and 18 are connected to the two inputs of an adder 24. Two signals $y_1$ and $y_2$ are obtained at the outputs of these two adders 23 and 24. These outputs are connected to the inputs of a differential amplifier 28. The signal y which issues from this differential amplifier is consequently zero if the laser 1 is properly positioned along the axis Oy. This means that the beam certainly arrives on the axis $\Delta_1$.

To perform the adjustment along the axis Ox, the procedure is the same as that described in the foregoing. The photodetectors 15 and 17 are thus connected to the two inputs of an adder 25. The photodetectors 16 and 18 are connected to the two inputs of an adder 26, and two signals $x_1$ and $x_2$ are consequently obtained at the outputs of these adders 25 and 26. These outputs are connected to the inputs of a differential amplifier 27. The signal x issuing from this differential amplifier 27 is zero if the laser is properly positioned along the axis Ox. This means that the beam certainly arrives on the axis $\Delta_2$.

To perform the adjustment along the axis Oz, a beam splitter element, for example a biprism 12, is interposed in the path of the beam 29 reflected by the splitting member 11, which may for example be a semitransparent panel, and behind this biprism 12, a photosensor detection system comprising two photodiodes 9 and 10. The biprism 12 is positioned at the point at which the reflected beam is still comparatively wide; that is to say at some distance from the image plane P of the objective 7 in which are situated the two photodiodes 9 and 10.

The width of the beam at the location of the biprism 12 should be sufficiently wide as compared to the positional tolerance perpendicular to the axis of the beam of the biprism and with respect to inaccuracies of the crest of the biprism.

Figure 3:
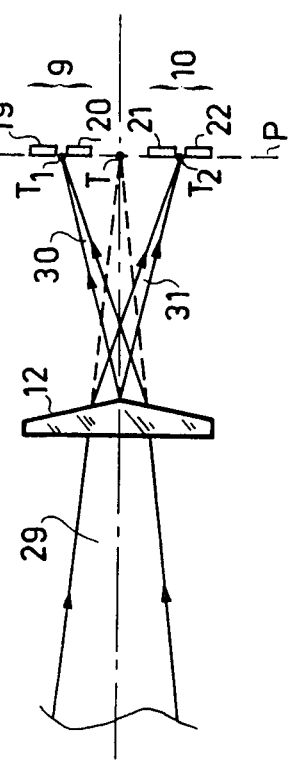
Figure 4:
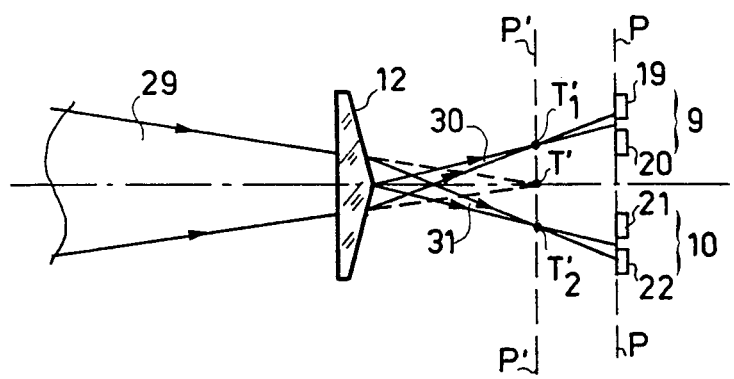
Figure 5:
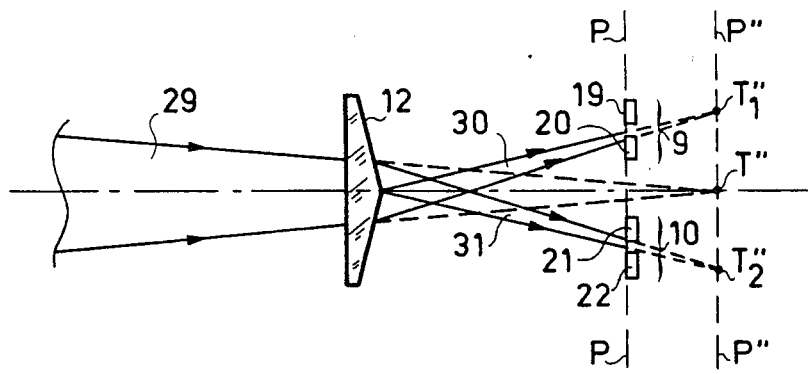

The biprism 12 splits the beam into two part beams 30 and 31, of which the beam 30 cooperates with the photodiode 9 and the partial beam 31 with the photodiode 10. The photodiodes 9 and 10 are divided into two parts: the detectors 19,20 and 21,22 as shown by FIGS. 3 to 5. These figures serve the purpose of illustrating the principal features of the system for adjustment along the axis Oz, so that they only illustrate the elements essential to a detection of this nature.

FIG. 3 illustrates the situation in which the read beam is focussed precisely on the plane P. In the absence of the biprism 12, the beam 29 should be focussed at the point T as shown by the pecked lines. The biprism 12 forms part beams 30 and 31 which are focussed at the points $T_1$ and $T_2$. Since the biprism 12 is situated at a distance from the photodiodes 9 and 10 such that, in the case of precise focussing, the points $T_1, T_2$ are situated precisely at the parting line of the detectors 19,20 and 21,22, respectively. The detectors 19 and 20 thus receive an identical quantity of radiation, like the detectors 21,22.

If, in the absence of the biprism, the beam 29 is focussed in front of the plane P, at T' in the plane P' as shown by FIG. 4, the focal points of the part beam 30 and 31 would be situated at the points $T'_1$ and $T'_2$ respectively. The detector sections 19 and 22 thus receive more radiation than the detectors sections 20 and 21, respectively.

If, in the absence of the biprism 12, the beam 29 is focussed in the plane P'' at T'' situated behind the plane P, the reverse occurs and the detectors 20 and 21 receive more radiation than the detector sections 19 and 22, respectively.

The biprism 12 receiving a convergent beam 29 of light according to FIG. 3, will thus generate two beams 30 and 31 as its output. These two beams 30 and 31 converge at the centre of the two-sector photodiodes 9 and 10, on the axis $\Delta_3$. Considering the change of illumination of the photodiodes as a function of the convergence of the incident beam, two cases consequently arise, the incident beam is convergent to a greater or lesser degree.

In the first case, considered in FIG. 4, the two beams issuing from the biprism are focussed before the plane P of the photodiodes 9 and 10. The photodetectors 19 and 22 are practically the only ones to be illuminated.

In the second case, considered in FIG. 5, the two beams issuing from the biprism are focussed behind the plane P of the photodiodes 9 and 10. The photodetectors 20 and 11 are practically the only ones to be illuminated.

In fact, the beam focussing from the laser module is either parallel, convergent or divergent, as a function of the position of the semiconductor laser 1 with respect to the focus of the first objective 3. The beam 29 incident on the biprism 12 will be convergent to greater or lesser degree by virtue of this fact, which explains this procedure for performing the positioning along Oz of the laser 1 with respect to the objective 3.

Figure 6:
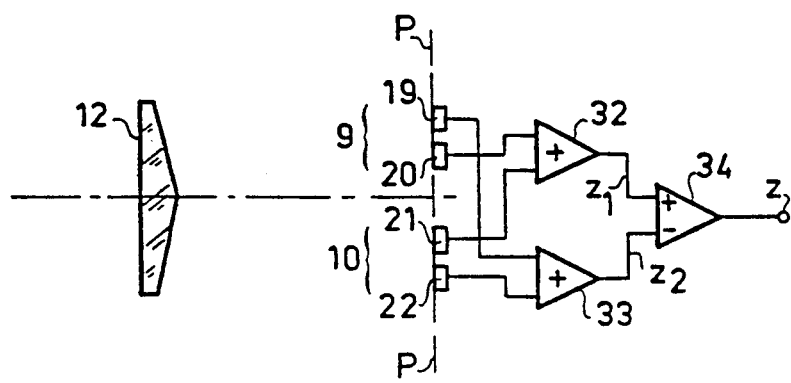

To perform this adjustment along the axis Oz, use is made of the electrical circuits illustrated in FIG. 6. The photodetectors 19 and 22 are connected to the two inputs of an adder 33. The photodetectors 20 and 21 are connected to the two inputs of an adder 32. The outputs of these two adders, which supply the signals $z_2$ and $z_1$, are connected to the two inputs of a differential amplifier 34 whose output delivers the signal z. Consequently, $$z = z_1 - z_2.$$

Knowledge of the signal z provides a data regarding the convergence of the signal 29 and consequently regarding the parallelism of the beam emerging from the optical device which comprises the laser 1 followed by the first objective 3.

In fact, the signal z emerging from this differential amplifier is zero if the laser is properly positioned along the axis Oz. This means that the luminous beam is emerging from the laser 1 - first objective 3 optical device is parallel and consequently that the photodetectors 19,20,21,22 are then illuminated uniformly.

Figure 7:
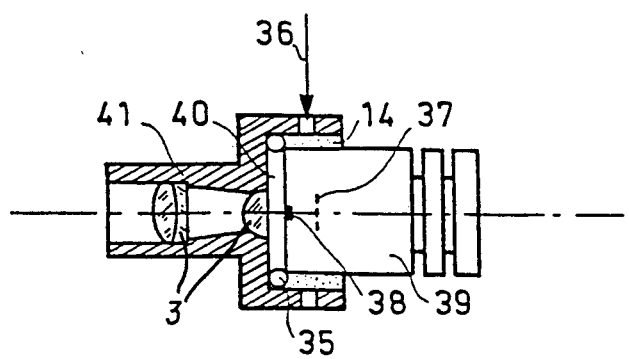
FIG. 7 illustrates the optical device obtained by means of the method of the invention.

In an example of an assembling method illustrated in FIG. 7, the laser case has a cylindrical section 39 which engages in a bore 40 solid with the first objective 3, the mechanical axis of the bore coinciding with the optical axis of the objective 3.

Sufficient mechanical play is present between the cylindrical part 39 of the laser and the bore of the mount 41 of the objective 3, to perform the x,y,z, adjustment. For example, this play may be that of a flexible toroidal joint 35. This play may for example, be of the order of 500 micrometers.

The laser having been positioned with respect to the axes Ox,Oy,Oz with respect to the first objective, this positioning is set by injection at 36 of an adequate volume of adhesive 14 into the aforesaid play.

A ring of adhesive 14 is consequently deposited between the cylindrical part 39 of the laser and the bore of the mount of the objective 41 which is illustrated with three lenses by way of example, but it would certainly also be possible to make use of a high quality aspherical lens.

In FIG. 7, a photodiode 37 has been installed in the rear area of the transmitting section 38 of the laser, which by virtue of the transmission of the semiconductor laser 1 via its rear surface, makes it possible to control the power of transmission of this laser 1 by feedback.

The rear of the cylindrical part 39 of the laser has been machined in FIG. 7, which acts as a radiator permitting heat dissipation.

In a preferred embodiment, the ring of adhesive 14 may be deposited prior to the adjustments along the axes Ox, Oy and Oz, if use is made of an adhesive polymerising at moderate speed, which consequently sets once the adjustments have been completed. Use is made of an adhesive which does not shrink, that is to say which does not undergo dimensional changes during polymerisation.

The positional adjustment being rapid, that is of the order of one minute, it is possible to make use of an adhesive polymerising in more than three minutes, for example.

Use may be made of a quick-setting adhesive of the "Araldite" type produced by the CIBA-GEIGY company, by way of non-restrictive example.

In this manner, it is possible to obtain a laser module which may be assembled in wholly automatic manner by making use of the signals x,y,z obtained from the signals detected by the photodiodes 8,9,10 which allow the performing of a three-dimensional adjustment. The optical device obtained which is assembled in simple manner, provides a beam having very little divergence, of which the optical axis coincides with the mechanical axis of the objective, and this optical device has a very small bulk.

In numerous optical arrays, in particular in the sphere of integrated optical heads, there is a need for light sources transmitting parallel and positionally located beams, for reasons of interchangeability and easy maintenance of alignment. The laser module produced according to the method described in the foregoing staisfactorily fulfils these requirements.

We claim:

1. An optical device for projecting a collimated beam of radiant energy, said device comprising:
   a casing having an outer cylindrical wall and an end portion containing a solid state laser source whose emissive zone releases a diverging beam of said energy;
   a lens mount supporting a lens with an optical axis carrying a rear focal point wherein said lens mount includes an end bore whose mechanical axis is co-axial with said optical axis and wherein said casing incompletely fills said end bore to thereby produce mechanical play sufficient for causing the apex of said diverging beam to coincide with said rear focal point; said bore and said casing being bridged with a bond of setting adhesive material and with compliant tightening means arranged for preventing leakage of said material toward said lens.

2. The device according to claim 1 wherein said compliant tightening means comprise a toroidal joint of flexible material; said bore having a ridge arranged between said lens and said end portion for supporting said toroidal joint.

3. The device according to claim 1 wherein said setting adhesive material is a polymerizable composition free of shrinkage.

4. The device according to claim 1 further including a backside photodiode provided in said casing for laser emission detection.

5. The optical device according to claim 1 further comprising a feed hole in said casing for injection of said adhesive material on the side of said bore away from said mount.

6. The optical device according to claim 1, wherein the portion of said casing not engaged in said bore has fins for improved heat removal.

* * * * *